United States Patent [19]  [11] 4,407,034
Ralphs  [45] Oct. 4, 1983

[54] MANUFACTURE OF SHOES

[75] Inventor: George T. Ralphs, Bradford-on-Avon, England

[73] Assignee: C & J Clark Limited, Street, Somerset, England

[21] Appl. No.: 166,113

[22] Filed: Jul. 7, 1980

[30] Foreign Application Priority Data

Apr. 21, 1980 [GB] United Kingdom ............ 801307

[51] Int. Cl.³ .................. A43D 9/00; A43D 13/08
[52] U.S. Cl. ............................. 12/142 RS; 36/14
[58] Field of Search ........... 12/142 R, 142 RS, 142 T; 36/14

[56] References Cited

U.S. PATENT DOCUMENTS 2,694,871 11/1954 Rollman .............................. 36/14
3,806,974 4/1974 Di Paolo ....................... 12/142 RS
3,812,604 5/1974 Sato ............................. 12/142 RS Primary Examiner—Patrick D. Lawson
Attorney, Agent, or Firm—Wenderoth, Lind & Ponack

[57] ABSTRACT

In a process for manufacturing shoes in which an outsole moulded in a sole mould by a first injection operation is joined to a lasted upper by a second injection operation the mould cavity for the second injection operation is defined by the lasted upper, side moulds and the out-sole while positioned within its sole mould and the joint between the side moulds and the sole mould is sealed by engagement of a marginal portion of the out-sole with the facing surfaces of the side moulds. In the case where the out-sole is shaped so as to provide in the finished shoe an exposed welt face the desired seal is effected by engagement of an inner marginal portion of the out-sole with the facing surface of the side moulds so as to leave an outer marginal portion, which forms the welt face, outside of the seal. Where this outer marginal portion is formed with a pattern the arrangement is such as to provide a small clearance between this outer marginal portion and the facing surface of the side moulds.

9 Claims, 5 Drawing Figures

MANUFACTURE OF SHOES

This invention relates to the manufacture of shoes, the word "shoe" being used in the broad sense to include where the context so permits any form of outer footwear, and more particularly to a process in which an out-sole is moulded in a first injection operation and is then joined to a lasted upper by a second injection operation during which a mid-sole and/or at least part of the upper may be formed.

In many types of shoe it is desirable that the out-sole is moulded of a material which has good wear properties while if a mid-sole is moulded during the second injection operation it is desirable that it is formed of a material which has good tread properties. Likewise it may be desirable that if the material used in the second injection operation is used to mould part of an upper, such material shall have properties different to those of the material used in the first injection operation to mould the out-sole. In many cases it may also be desired that these two materials have different colours.

It is convenient to use suitably formulated polyurethane compositions for each injection operation but usually such compositions are initially of low viscosity. This leads to problems occasioned by leakage of the material through the joints of the mould, and particularly leakage of the material used in the second injection operation over the outer edges of the out-sole, which leakage, especially if different colours are being used, may ruin the appearance of the shoe.

It is an object of the present invention to provide improved methods and apparatus which will avoid such problems.

According to the present invention in a process for manufacturing shoes in which an out-sole moulded in a sole mould by a first injection operation is joined to a lasted upper by a second injection operation the mould cavity for the second injection operation is defined by the lasted upper, side moulds, and the out-sole while positioned within its sole mould, and the joint between the side moulds and the sole mould is sealed by the engagement of a marginal portion of the out-sole with the facing surface, that is the underface, of the side moulds.

Conveniently the sealing engagement of the out-sole with the side moulds is brought about by moving the sole mould between the side moulds after they have been closed about the sole mould and about a lasted upper until a peripheral rim of the sole mould engages the underface of the side moulds.

In the case where the out-sole is shaped so as to provide in the finished shoe an exposed welt face formed by the material of the first injection it is important that the material of the second injection is not allowed to flash over this welt face. To this end the sealing of the joint between the sole mould and the side moulds is effected by engagement of an inner marginal portion of the out-sole with the underface of the side moulds so as to leave an outer marginal portion of the out-sole, which forms the welt face, outside of the seal.

Since the designer of the shoe may require the welt face to have a pattern which, for example, simulates stitching, and since moreover the second injection may be performed before the material of the first injection is fully cured, it is essential that no pressure is applied to this region during the second injection operation. Accordingly the arrangement used in such that sealing engagement between the out-sole and the underface of the side moulds occurs only over an inner marginal portion of the out-sole and up to the feather line region of the shoe and that there is no contact between the underface of the side moulds and the outer marginal portion of the out-sole which forms the welt face. To assist in achieving this result the lid, which with the sole mould defines the cavity in which the out-sole is moulded, may be so shaped that the outer marginal portion, that is the welt face, of the out-sole is slightly recessed below the rim of the sole mould. Alternatively that part of the underface of the side moulds which during the second injection overlies the outer marginal portion of the out-sole may be slightly recessed so that it does not contact this marginal portion even if it extends flush with the rim of the sole mould.

When using the process of this invention it is desirable that the out-sole moulded in the first injection operation shall be free of flash so that a subsequent flash trimming operation is avoided. For this purpose the flange of the lid of the sole mould which matingly engages the rim of the sole mould to define the mould cavity may have a built-in sealing strip which seals against the rim of the sole mould and is positioned so that its inner edge is in line with the inner wall of this rim. In this way the outer edge of the out-sole will be clean and free from flash despite irregularities in contact between flange and rim.

In order that the invention may be clearly understood some examples thereof will now be described with reference to the accompanying drawings in which.

Figure 2:
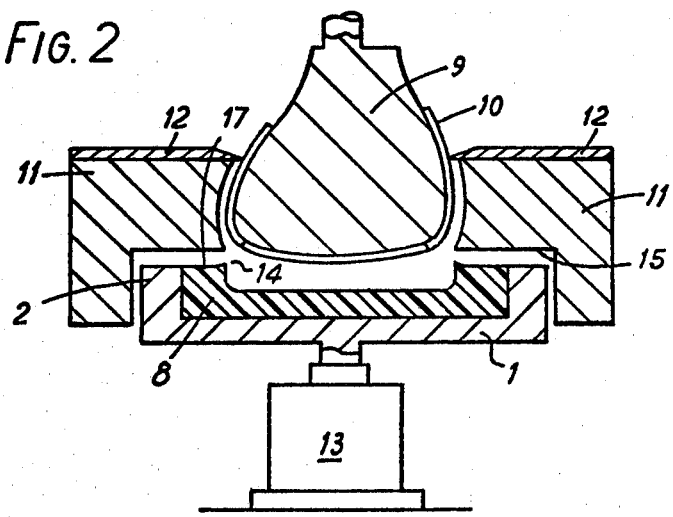
FIG. 2 is a diagrammatic section showing a sole mould with an out-sole moulded therein, side moulds and lasted upper preparatory to carrying out a second injection for joining the out-sole to the lasted upper.
Figure 3:
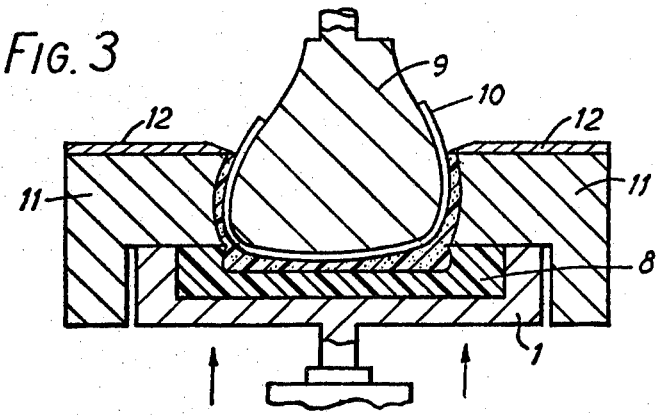
Figure 4:
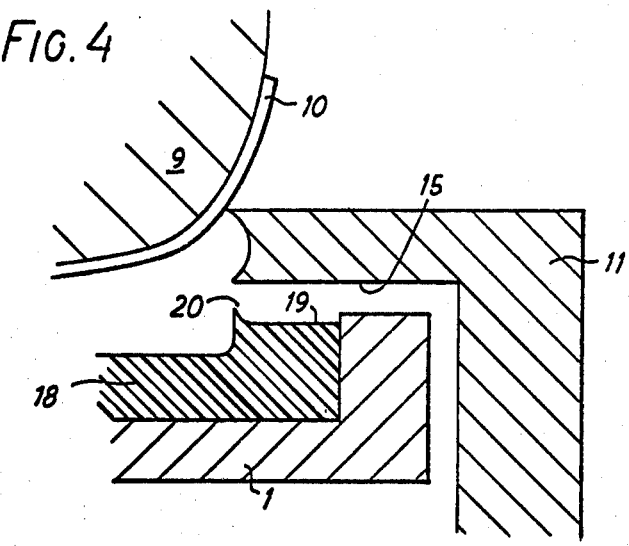
Figure 5:
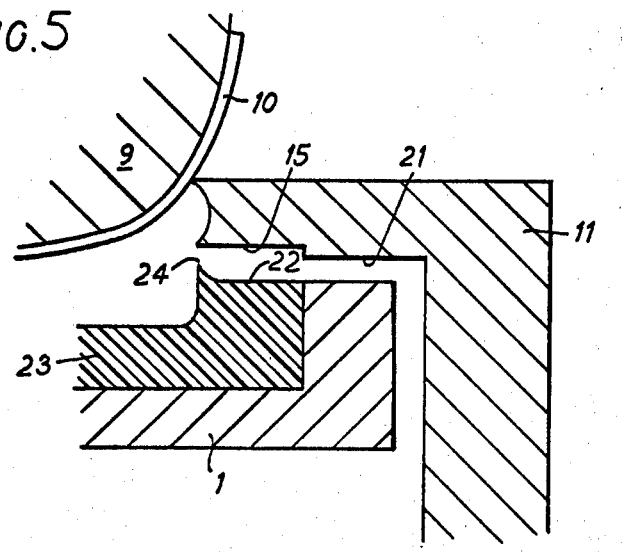

FIG. 3 corresponds to FIG. 2 but shows the arrangement after the second injection has been performed; and FIGS. 4 and 5 are diagrammatic part sections corresponding to FIG. 2 illustrating alternative ways of preventing contact of the side moulds with a patterned welt face on an out-sole.

Figure 1:
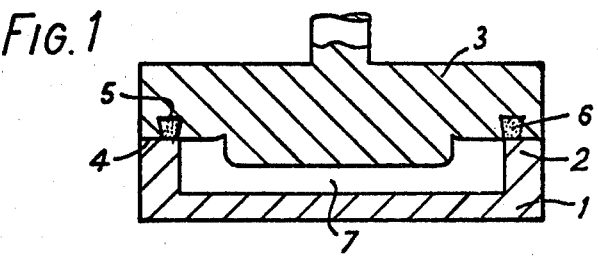
FIG. 1 is a diagrammatic section of a sole mould and cooperating lid for use in making an out-sole during a first injection.

Referring to FIG. 1 the arrangement thereshown, which is for moulding an out-sole in a first injection operation, consists of a sole mould 1 having a peripheral rim 2 and a removable lid 3 having a peripheral flange 4. In use the flange and rim abut but owing to the complex curvature it is almost impossible to achieve a leak-proof joint even if the lid 3 is made by casting a suitable resin onto the sole mould 1. Accordingly the flange 4 of the lid 3 is formed with a peripheral groove 5 which is slightly wider at its base than at its opening and this groove accomodates a sealing strip 6 of suitable resilient material. Owing to the section of the strip and groove the strip is securely retained in position during use but can nevertheless be readily removed when worn and a new strip can be inserted without difficulty.

By positioning the inner edge of the sealing strip 6 in line with the inner wall of the rim 2 of the sole mould 1 the edge of an out-sole moulded in the cavity 7 will be clean and free from undesired flash.

For reasons to be explained below the lid 3 is so shaped that at least part of the upper edge of the mould cavity 7 extends slightly above the rim 2 of the sole mould 1 with the result that after an out-sole has been moulded and the lid removed the inner edge at least of a marginal position of the out-sole extends proud of the rim of the sole mould.

FIG. 2 shows an arrangement for joining the out-sole to a lasted upper by means of a second injection operation during which operation a mid-sole and part of an upper is also formed. Here the sole mould 1 with a moulded out-sole 8 positioned therein is shown with the lid 3, of FIG. 1, removed and a last 9 with an upper 10 thereon suitable positioned above the sole mould. Side moulds 11, not shown in FIG. 1, are shown in their closed position with sealing members or knives 12 in sealing engagement with the upper 10. The sole mould 1 is also shown as supported for vertical movement by an actuator 13. With the parts in the position shown in FIG. 2 it can be seen that the inner edge 14 of the marginal portion of the out-sole 8 extends proud of the rim 2 of the sole mould 1 by a small distance which may be of the order of ½ mm., while there is a small gap between the rim 2 of the sole mould and the underface 15 of the side moulds, which gap may be of the order of 2 mm. These dimensions allow the side moulds 11 to be moved to their closed position without fouling the edge 14 of the out-sole.

It may also be seen that the underface 15 of the side moulds overlies the raised edge 14 of the out-sole 8. This ensures that when the mould cavity 16 is closed by raising the sole mould 1 to the position shown in FIG. 3 the edge 14 of the out-sole will be sealingly engaged by the underface 15 of the side moulds as the rim 2 of the sole mould is moved into contact with the underface of the side moulds.

The sealing of this part of the mould cavity 16 which is effected by engagement of the edge 14 of the out-sole with the underface 15 of the side moulds not only operates to prevent the formation of an undesirable flash between the rim 2 of the sole mould 1 and the underface 15 of the side moulds 11 but also ensures that the moulding material for the second injection does not flash across the welt face 17 or penetrate between the edge of the out-sole and the wall of its mould which, if different colour compositions are used, would ruin the appearance of the shoe.

It will be appreciated that in the arrangement of FIGS. 2 and 3 the material of the second injection not only forms a mid-sole of appreciable thickness but, because of the height of the side moulds, extends over the toe-cap and up the sides of the shoe, the only visible sole being the out-sole.

The arrangement is described merely by way of example and may be modified according to the desired appearance of the finished shoe.

Where an outer marginal portion of the out-sole provides a welt in the finished shoe as is the case of the shoe of FIG. 3 it may be desired to provide this face with a pattern which, for example, simulates stitching. While such pattern can of course be achieved by appropriately shaping the relevant part of the lid 3 of the sole mould (FIG. 1) it is important to ensure that the pattern does not come into contact with the underface of the side moulds when the sole mould is closed there-against. If this is not done there would be a tendency to obliterate the pattern especially if the material of the out-sole is not fully cured at the time of the second injection.

As shown in FIG. 4, which corresponds to FIG. 2 but is on a somewhat larger scale, this result may be achieved by shaping the lid 3 of the sole mould 1 (FIG. 1) in such a way as to form an out-sole with the outer marginal portion 19 recessed below the rim 2 of the sole mould 1 but leaving the inner marginal portion 20 proud of this rim. Equivalently and as shown in FIG. 5 the underface 15 of the side moulds may be formed with a shallow step 21 which is engaged by the rim 2 of the sole mould 1 and thus provide a clearance between the underface 15 of the side moulds and the outer marginal portion 22 of the out-sole 23 which in this case may be flush with the rim 2 of the sole mould 1. Also in this case the inner marginal portion 24 of the out-sole will extend somewhat higher than the rim 2 in order to ensure sealing engagement with the underface 15 of the side moulds.

FIGS. 4 and 5 also illustrate that a shoe of different appearance may be produced merely by making appropriate changes in the shape of the side moulds, the shoe in this case merely having a bead of the material of the second injection extending round the feather line of the shoe between the upper and the welt face of the out-sole. It is equally possible to provide the shoe with a mud guard formed of the material of the second injection.

In practising the invention the lid of the sole mould and a post for the last may be mounted on a rotatable head which may also be moved bodily in a vertical direction to bring either the lid or the last into or out of its operating position.

In the case where the material of the out-sole contains little or no blowing agents it is practicable to remove the lid very soon after the first injection and to perform the second injection before the out-sole material has been finally cured, a procedure which ensures good bonding between the two materials.

The inventionn ensures the production of flash-free mouldings when using low viscosity moulding compositions and a clean line of demarcation between moulded compositions of different colour.

I claim:

1. A process for manufacturing shoes comprising the steps of:
   (1) moulding an out-sole having a raised peripheral portion by injection of a first substance in a first cavity defined between a sole mould having a peripheral rim and a lid, said raised marginal portion extending above said rim of said sole mould;
   (2) providing a lasted upper spaced from said out-sole;
   (3) moving side moulds having a surface facing said raised portion of said out-sole over said rim of said sole mould while said out-sole is positioned in said sole mould so that said surface of said side moulds sealingly engages said raised margin portion to form a sealed joint between said rim of said sole mould and said surface and to define a second cavity formed by said lasted upper, said out-sole and said side moulds; and
   (4) joining said lasted upper to said out-sole by injecting a second substance into said second cavity.

2. A process as in claim 1 wherein said steps of moving side moulds includes the step of closing said side moulds about said sole mould and said lasted upper, and the step of moving said sole mould toward said surface of said side moulds.

3. A process as in claim 1 or claim 2 wherein the shoe when finished has a feather line and wherein the sealing engagement between the out-sole and the side moulds is effected at about the location of said feather line.

4. A process as claimed in claim 1 wherein the sealing engagement between the out-sole and the side moulds is effected at an inner marginal portion of the out-sole so as to leave outside of the location of the sealing engagement an outer marginal portion of the out-sole which, when manufacture of the shoe is finished, forms the welt face.

5. A process as in claim 4 wherein step (1) includes the step of forming said welt face with a pattern, said out-sole having an outer marginal portion outside said raised marginal portion facing said surface of said side moulds, and wherein during step (3) and step (4) said outer marginal portion of said out-sole is spaced from said surface of said side moulds.

6. A process as in claim 5 wherein said lid of said sole mould is so shaped that during step (1) said outer marginal portion of said out-sole is moulded slightly recessed below said rim of said sole mould.

7. A process as in claim 5 wherein said surface of said side mould includes a portion which faces said rim of said sole mould during said steps (3) and (4), said portion of said surface having a shallow step which during said step (4) engages said rim of said sole mould to prevent contact between said outer marginal portion of said out-sole and said surface of said side moulds.

8. A process as claimed in claim 1 wherein said lid of said sole mould is so shaped that the out-sole moulded during step (1) is formed with an upstanding peripheral rim and that said raised marginal portion is formed on the inner marginal edge of said upstanding peripheral rim of said out-sole.

9. A process as in claim 1 wherein said lid of said sole mould has a flange that engages and mates with said rim of said sole mould during said step (1), said rim of said sole mould having an inner wall, and said joint is sealed during said step (1) by a sealing strip which is accommodated in a groove in said flange, and said strip having an inner edge during said step (1) which is in line with said inner wall of said rim of said sole mould.

* * * * *